US010459830B2

(12) United States Patent
Ren et al.

(10) Patent No.: US 10,459,830 B2
(45) Date of Patent: *Oct. 29, 2019

(54) EXECUTABLE CODE ABNORMALITY DETECTION

(71) Applicant: ENTIT SOFTWARE LLC, Sanford, NC (US)

(72) Inventors: Yi-Qun Ren, Shanghai (CN); Hai-Ying Liu, Shanghai (CN); Bo Wang, Shanghai (CN)

(73) Assignee: MICRO FOCUS LLC, Santa Clara, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 15/326,326

(22) PCT Filed: Jul. 29, 2014

(86) PCT No.: PCT/CN2014/083218
§ 371 (c)(1),
(2) Date: Jan. 13, 2017

(87) PCT Pub. No.: WO2016/015220
PCT Pub. Date: Feb. 4, 2016

(65) Prior Publication Data
US 2017/0206155 A1 Jul. 20, 2017

(51) Int. Cl.
*G06F 11/36* (2006.01)

(52) U.S. Cl.
CPC ......... *G06F 11/3684* (2013.01); *G06F 11/36* (2013.01); *G06F 11/3672* (2013.01); *G06F 11/3688* (2013.01)

(58) Field of Classification Search
CPC ............. G06F 11/3636; G06F 11/3684; G06F 11/3688; G06F 11/36; G06F 11/3672
(Continued)

(56) References Cited

U.S. PATENT DOCUMENTS 6,378,088 B1 * 4/2002 Mongan ............. G06F 11/3684
703/22
7,810,071 B2 * 10/2010 Thebes ................. G06F 11/366
714/38.14
(Continued)

FOREIGN PATENT DOCUMENTS

| CN | 1983209 A | 6/2007 |
|---|---|---|
| CN | 103365772 A | 10/2013 |
| WO | WO-2014117320 A1 | 8/2014 |

OTHER PUBLICATIONS froglogic.com, "How to Do Automatic Stress Testing on Qt," (Web Page), Froglogic Squish, Aug. 6, 2010, 4 pages, available at http://doc.froglogic.com/squish/4.0/all/ug-stresstesting.html.
(Continued)

Primary Examiner — Marina Lee

(57) ABSTRACT

Executable code abnormality detection can include detecting user-activatable control elements of an executable code to be tested, generating a first test code based on the detected user-activatable control elements, and generating a second test code based on a script for the executable code to be tested, wherein the first and the second test codes containing instructions executable by a test application to test the executable code. Further, executable code abnormality detection can include executing the first test code and the second test code using the test application, and in response to the test application detecting an abnormality, saving instructions from the executed first test code and the executed second test code into a persistent file to allow replay of the abnormality.

19 Claims, 7 Drawing Sheets

(58) Field of Classification Search
USPC .......................................... 717/106, 124–135
See application file for complete search history.

(56) References Cited

U.S. PATENT DOCUMENTS

| | | | | |
|---|---|---|---|---|
| 7,886,267 | B2* | 2/2011 | Pratt | ..................... G06F 9/4448 717/104 |
| 8,479,164 | B2 | 7/2013 | Becker et al. | |
| 8,904,358 | B1* | 12/2014 | Peri-Glass | .......... G06F 11/3608 717/126 |
| 9,710,366 | B2* | 7/2017 | Luan | ................... G06F 11/3692 |
| 2003/0074423 | A1* | 4/2003 | Mayberry | ........... G06F 11/3672 709/219 |
| 2007/0234121 | A1* | 10/2007 | He | ..................... G06F 11/3684 714/33 |
| 2008/0127045 | A1* | 5/2008 | Pratt | ..................... G06F 9/4448 717/104 |
| 2009/0320002 | A1* | 12/2009 | Peri-Glass | ................ G06F 8/38 717/131 |
| 2011/0088018 | A1* | 4/2011 | Foley | .................. G06F 11/3684 717/131 |
| 2012/0216176 | A1 | 8/2012 | Gaikwad et al. | |
| 2013/0159974 | A1 | 6/2013 | Norton et al. | |
| 2013/0290875 | A1* | 10/2013 | Dixit | ................... G06F 11/3664 715/760 |
| 2013/0339930 | A1* | 12/2013 | Xu | ...................... G06F 11/3684 717/125 |
| 2014/0165040 | A1 | 6/2014 | Augustin et al. | |
| 2015/0324275 | A1* | 11/2015 | Luan | .................. G06F 11/3692 717/124 |
| 2017/0206155 | A1* | 7/2017 | Ren | ........................ G06F 11/36 |
| 2017/0220452 | A1 | 8/2017 | Ren | |

OTHER PUBLICATIONS

International Search Report & Written Opinion received in PCT Application No. PCT/CN2014/083218, dated May 6, 2015, 14 pages.

* cited by examiner

REGISTRATION — 432

MY NAME IS: ⬚ ~433

MY EMAIL ADDRESS IS: ⬚ ~434

TYPE IT AGAIN: ⬚ ~435

MY MOBILE PHONE NUMBER IS: ⬚ ~436

LEARN MORE ~442

ENTER A NEW PASSWORD: ⬚ ~437

TYPE IT AGAIN: ⬚ ~438

CREATE ACCOUNT ~439

440

BY CREATING AN ACCOUNT, YOU AGREE TO OUR CONDITIONS OF USE AND PRIVACY NOTICE ~441

Fig. 4

EXECUTABLE CODE ABNORMALITY DETECTION

BACKGROUND

When developing executable code such as applications, tests are run against the executable code. In some cases, the testing of the executable code can be performed manually by a user. One type of test that can be performed by the user is a monkey test, where the user can randomly operate controls of the executable code to determine whether the executable code exhibits some abnormality (e.g., a crash of the executable code or other abnormal behavior).

BRIEF DESCRIPTION OF THE DRAWINGS

FIG. 4 illustrates a diagram of an example user interface (UI) screen consistent with the present disclosure.

DETAILED DESCRIPTION

Figure 1:
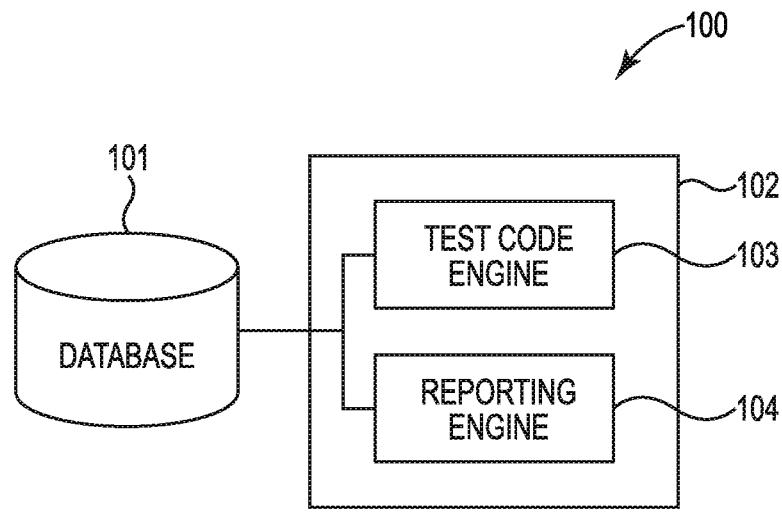
FIG. 1 illustrates a diagram of an example of a system for executable code abnormality detection consistent with the present disclosure.

An "abnormality" of executable code can refer to a crash of the executable code, a fault of the executable code, or other unexpected behavior exhibited by the executable code during a test. A monkey test can be relatively time consuming, especially if the monkey test is performed manually by a user. As used herein, a monkey test is a particular test of a particular type that when executed by a processing resource, performs a test on executable code. As further described herein, a monkey test may be capable of being performed by a test application.

A test application for testing executable code includes various random actions that can be performed with respect to features of an executable code that is under test. Executable code can be an executable file or program that causes a computer to perform indicated tasks according to encoded instructions. Examples of executable code can include applications, operating systems, device drivers, firmware, or other machine-readable instructions. The features of the executable code that may be capable of being controlled in a test application can include user interface (UI) control elements that are activatable (e.g., may be capable of being selected) by a user. As used herein, UI control elements that are activatable by a user are referred to as user-activatable control elements. The UI control elements can be graphical user interface (GUI) control elements, or any other control elements presented by the executable code for user activation. The user-activatable control elements may be capable of determining an execution sequence of the executable code.

In some examples, the UI control elements can include buttons that are clickable by users, text boxes in which users can enter text, and drop-down menus activatable by a user to cause presentation of a menu including various control items that are selectable by a user, for example. As used herein, the combination of a drop-down menu and a text box is referred to as a combo box. That is, an item capable of selection in one of two ways: by selection from a drop down menu or by filling the item in a text box directly. Also, as used herein, a text box is referred to as an edit box. During a test application, the executable code may be capable of being operated in an unplanned manner to identify abnormalities.

Issues with performing a monkey test using a test application may include the inability to easily reproduce a particular combination of actions that resulted in an abnormality. For example, some traditional approaches use screen recorder tools to record the screen of the test application, so that the operations executed prior to the abnormality can be identified. However, such an approach may be time consuming and labor intensive, and some operations may be difficult to distinguish by video.

In contrast, executable code abnormality detection consistent with examples of the present disclosure allows for automated generation of test code for use by a test application. The test application may be capable of saving information relating to actions taken in testing the executable code, such that a test resulting in an abnormality of the executable code can be recreated.

FIG. 1 illustrates a diagram of an example of a system 100 for executable code abnormality detection consistent with the present disclosure. As shown in the example of FIG. 1, the system 100 can include a database 101 accessible by and in communication with a plurality of executable code abnormality detection engines 102. The executable code abnormality detection engines 102 can include a test code engine 103, and a reporting engine 104. The system 100 can include additional or fewer engines than illustrated to perform the various functions described herein, and embodiments are not limited to the example shown in FIG. 1. The system 100 can include hardware, firmware, and programming, which in cooperation can form a computing device as discussed in connection with FIG. 2. Hardware can be in the form of transistor logic and/or application specific integrated circuitry (ASICs). Further, programming can be in the form of machine-readable and executable instructions (e.g., program instructions or programming) stored in a machine-readable medium (MRM).

The plurality of engines, e.g., 103, 104, as used herein can include a combination of hardware and programming (e.g., program instructions), but at least includes hardware, that is configured to perform particular functions, tasks and/or actions. For example, the engines shown in FIG. 1 may be capable of being used to detect user-activatable control elements of an executable code to be tested, generate a first test code based on the user-activatable control elements, and generate a second test code based on a script for the executable code to be tested.

For example, the test code engine 103 can include hardware and/or a combination of hardware and program instructions to detect user-activatable control elements of an executable code to be tested, generate a first test code based on the user-activatable control elements, and generate a second test code based on a script for the executable code to be tested, the first and the second test codes containing instructions executable by a test application to test the executable code. In some examples, the test code engine may be capable of generating the second test code by randomly inserting additional commands into the script, as discussed further herein. Further, in some examples, the test code engine may be capable of generating the second test code by disordering commands in the script. Additionally, the test code engine 104 can include hardware and/or a combination of hardware and program instructions to execute the first test code and the second test code using a test application.

Also, the reporting engine 104 can include hardware and/or a combination of hardware and program instructions to save instructions from the executed first test code and the executed second test code into a persistent file to allow replay of an abnormality, in response to the test application detecting the abnormality.

Examples of the present disclosure are not limited to the example engines shown in FIG. 1 and one or more engines described may be combined or be a sub-engine of another engine. Further, the engines shown may be remote from one another in a distributed computing environment, cloud computing environment, etc.

Figure 2:
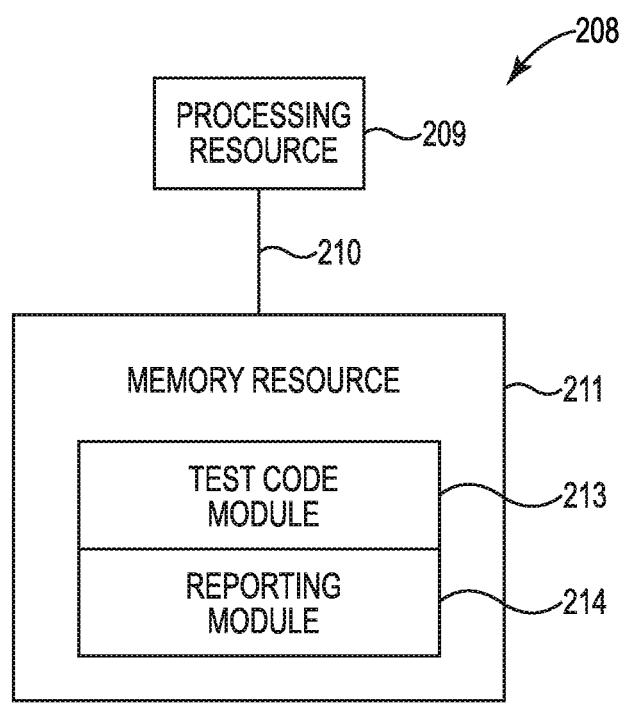
FIG. 2 illustrates a diagram of an example computing device consistent with the present disclosure.

FIG. 2 illustrates a diagram of an example computing device 208 consistent with the present disclosure. The computing device 208 can utilize hardware, programming (e.g., program instructions), firmware, and/or logic to perform a number of functions described herein. The computing device 208 can be any combination of hardware and program instructions configured to share information. The hardware, for example, can include a processing resource 209 and/or a memory resource 211 (e.g., computer or machine-readable medium (CRM/MRM)), database, etc. A processing resource 209, as used herein, can include one or more processors capable of executing instructions stored by a memory resource 211. The processing resource 209 may be implemented in a single device or distributed across multiple devices. The program instructions (e.g., computer- or machine-readable instructions (CRI/MRI)) can include instructions stored on the memory resource 211 and executable by the processing resource 209 to perform a particular function, task and/or action. For example, the memory resource 211 can include instructions that when executed by the processing resource 209, may be capable of executing a first test code and a second test code using a test application.

The memory resource 211 can be a non-transitory machine-readable medium, including one or more memory components capable of storing instructions that may be capable of being executed by processing resource 209 and may be integrated in a single device or distributed across multiple devices. Further, memory resource 211 may be fully or partially integrated in the same device as processing resource 209 or it may be separate but accessible to that device and processing resource 209. Thus, it is noted that computing device 208 may be implemented on a participant device, on a server device, on a collection of server devices, and/or a combination of a participant (e.g., user) device and one or more server devices as part of a distributed computing environment, cloud computing environment, etc.

The memory resource 211 can be in communication with the processing resource 209 via a communication link, e.g., a path, 210. The communication link 210 may be capable of providing a wired and/or wireless connection between the processing resource 209 and the memory resource 211.

In the example of FIG. 2, the memory resource 211 can include a test code module 213, and a reporting module 214.

As used herein, a "module" can include hardware and programming (e.g., program instructions) but includes at least program instructions that can be executed by a processing resource, such as processing resource 209, to perform a particular task, function and/or action. The plurality of modules 213, 214 can be independent modules or sub-modules of other modules. As shown in FIG. 2, the test code module 213, and the reporting module 214, can be individual modules located on one memory resource or can be located at separate and distinct memory resource locations, such as in a distributed computing environment, cloud computing environment, etc.

Each of the plurality of modules 213, 214 can include instructions that when executed by the processing resource 209 may be capable of functioning as a corresponding engine as described in connection with FIG. 1. For example, the test code module 213 can include instructions that when executed by the processing resource 209 may be capable of functioning as the test code engine 103 shown in FIG. 1. Additionally, the reporting module 214 can include instructions that when executed by the processing resource 209 may be capable of functioning as the reporting engine 104 shown in FIG. 1.

In some examples, the test code module 213 may be capable of detecting user-activatable control elements of an executable code to be tested. Further, the test code module 213 may be capable of generating a first test code based on the detected user-activatable control elements, and generating a second test code based on a script for the executable code to be tested. In some examples, the test code module 213 may be capable of generating the first test code based on at least one test rule, as discussed further herein. The at least one test rule can include priorities assigned to the respective user-activatable control elements and implementation probabilities assigned to the respective user-activatable elements.

Also, the test code module 213 may be capable of executing the first and the second test codes using a test application. The test application is thereby capable of performing a test of the executable code, and may be capable of determining additional user-activatable control elements of the executable code. As discussed further herein, the test code module 213 may be capable of iterating the generation of the first and the second test codes and the execution of the first and second test codes until a stopping criterion is satisfied. In some examples, the test code module 213 may be capable of using a translation string map to detect untranslated strings in the executable code. A translation-string map may be capable of mapping a string written in a specific language to the string in a different language and vice versa. For example, the translation string-map may be capable of mapping a string written in English to a string written in Japanese. Also, in some examples, executing the first test code causes performance of actions including automatic operation of elements of the executable code.

The reporting module 214 may be capable of, in response to the test code engine detecting an abnormality in the executable code, save instructions of the first and the second test codes to allow a replay of the first and the second test codes to identify a cause of the detected abnormality.

Embodiments are not limited to the example modules shown in FIG. 2 and in some cases a number of modules can operate together to function as a particular engine. Further, the engines and/or modules of FIGS. 1 and 2 can be located in a single system and/or computing device or reside in separate and distinct locations in a distributed network, computing environment, cloud computing environment, etc.

Figure 3:
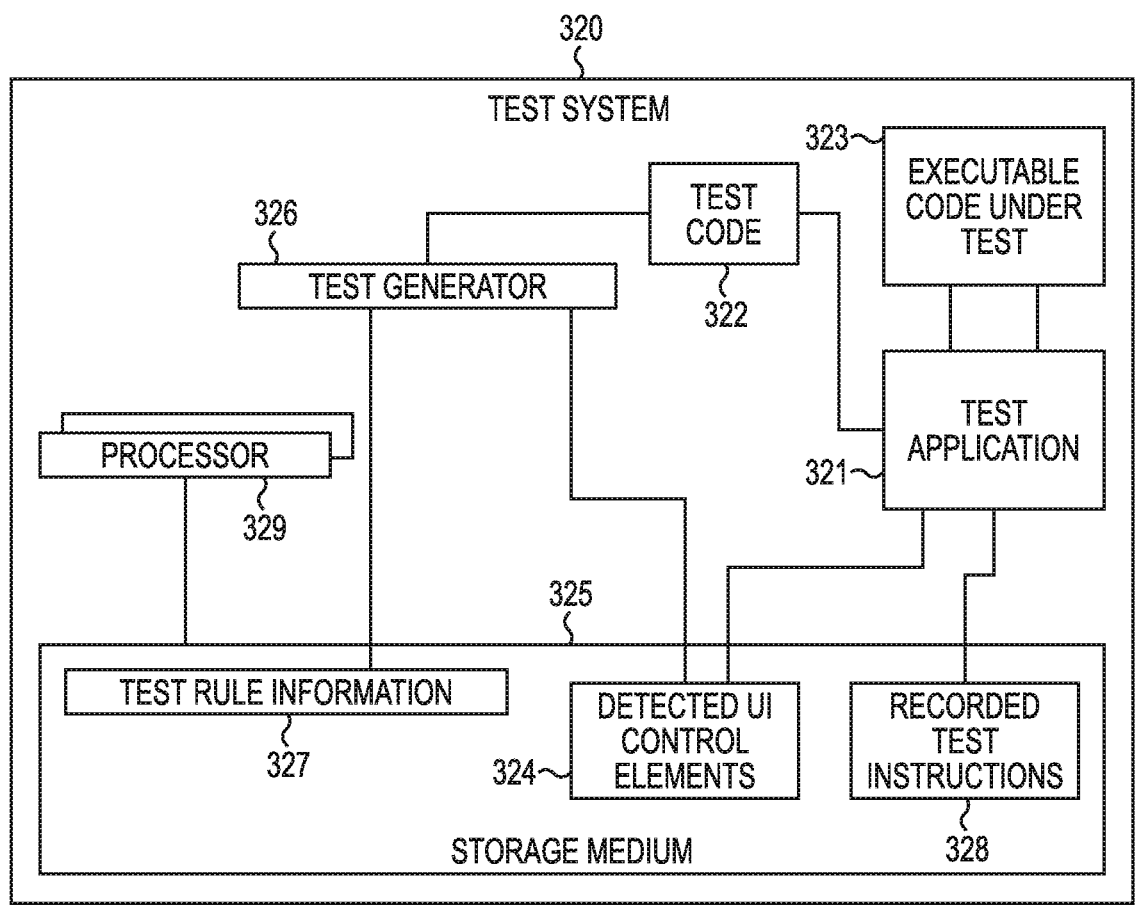
FIG. 3 is a block diagram of an example test system consistent with the present disclosure.

FIG. 3 is a block diagram of an example test system 320 consistent with the present disclosure. The test system 320 includes a test application 321, which may be capable of performing a test by applying a test code 322 with respect to an executable code under test 323. The test application 321 can include an interface to the executable code under test 323 that allows the test application 321 to identify and operate the UI control elements of the executable code under test 323. Using the test code engine 103 and/or the test code module 213, the test application 321 may be capable of detecting UI control elements generated by the executable code undertest 323. The executable code under test 323 can generate one or multiple windows, where each window can include one or multiple UI control elements that may be capable of being operated by the test application 321. Detecting a UI control element by the test application 321 can include identifying UI control elements not previously known to a user of the test application 321. The detected UI control elements may be capable of being stored as detected UI control elements 324 in a storage medium 325.

The test system 320 further includes a test generator 326, which, using the test code engine 103 and/or the test code module 213, may be capable of generating test codes 322 (or other type of test script) based on test rule information 327 and the detected UI control elements 324 stored in the storage medium 325. As used herein, a test code refers to a collection of machine-readable program instructions that are executable to perform a particular test. The test code 322 can be provided as an input to the test application 321. Although the test application 321 and test generator 326 are depicted as being separate in FIG. 3, it is noted that the test generator 326 may be capable of being part of the test application 321 in other examples. In some other examples, test rule information 327 is used in generating the test code 322 based on the detected UI control elements 324, and the test generator 326 may be capable of generating a test code that includes random actions to be performed in the test application.

The test rule information 327 specifies the actions that are to be performed in the test application 321 and executed by the test code 322. The test rule information 327 can include one or multiple test rules. Each test rule may be capable of specifying a specific action or type of action that is to be taken, and the corresponding relative frequency of operation. The relative frequency of operation of each test rule can be expressed as a percentage or as another value. For example, a first test rule can specify that a first action is to be performed with 90 percent probability, and a second rule can specify that a second action is to be performed with 70 percent probability. The first action can involve a first task or some combination of tasks to be performed with respect to one or multiple UI control elements. Similarly, the second action can specify a second task or some combination of tasks to be performed with respect to another one or multiple UI control elements.

As UI control elements are detected by the test application 321, the test rule information 327 may be capable of being modified, such as by adding more test rules for additionally identified UI control elements, or modifying existing test rules to account for the additionally identified UI control elements.

The following is an example of a test rule, consistent with the present disclosure, which may be capable of being used to generate a first test code. The test rule set forth below specifies both probabilities and priorities associated with different types of UI control elements:

| Probability | Priority | UI Control Element Type |
|---|---|---|
| 40% | 1 | Button, and button test in [OK, Submit, "*Add to Cart*:, . . . ] |
| 60% | 9 | TextBox |
| 60% | 8 | ComboBox |
| 60% | 8 | SpinBox |
| 60% | 8 | RadioButton |
| 30% | 1 | Button, and button text in [Cancel, Help, . . . ] |

In the foregoing example, a higher priority number indicates a higher priority associated with the particular type of UI control element relative to the priority associated with other UI control elements. In the example given above, the priority of "9" is the highest priority and is associated with the TextBox control element type. Similarly, the priority of "1" is the lowest priority and is associated with the button, and button text in the cancel and help button UI control element type. As such, the priority associated with the TextBox UI control element type is higher than the priority associated with the button and button text UI control element type.

The first column of the foregoing table specifies the implementation probability for the respective UI control element type. The second column specifies the corresponding priority. The third column identifies the UI control element type. The first row of the foregoing table relates to a first group of buttons, including an "OK" button, a "Submit" button, an "Add to Cart" button, among other buttons. The last row of the foregoing table relates to a second group of buttons, including the "Cancel" button, the "Help" button, and so forth. The implementation probability in the first row is different from the implementation probability in the last row for the different groups of buttons. The other rows of the foregoing table relate to other types of control elements.

The process of generating test code for a specific window, such as the window of a web page or other type of window, can be repeated for each window of an executable code under test 323.

Consistent with some examples, the test rule(s) in the test rule information 327 may be capable of being expressed in a non-program format. In other words, each test rule is not expressed in a program code, such as a block of program instructions. The test rules of the test rule information 327 may be capable of being in the form of a list of parameters and respective assigned values, where the parameters and respective assigned values may be capable of indicating corresponding actions to be performed with respect to the UI control elements of the executable code under test. For example, the test rules can be in a table, spreadsheet and/or in a file according to another format.

In some examples, the test generator 326 may be capable of generating test code 322 based on a script for the executable code to be tested. The script can be an ordered list of commands to be executed by the executable code to be tested 323. For instance, the script can be an ordered list of commands to be executed by an application. An example is illustrated in FIG. 4. A script can be a pre-defined script, when the ordered list of commands are previously defined and written in a programming language executable by a processor.

FIG. 4 illustrates a diagram of an example UI screen consistent with the present disclosure. In a user-registry web-page 432 for a particular application, a script for the page can require that the user enter their name in a name field 433, enter their email in an email field 434, re-enter their email in a second email field 435, enter their mobile number in a mobile phone number field 436, enter a new password into a password field 437, re-enter the password into a password field 438, then click the "create account" link 439. The test generator 326 may be capable of generating test code 322 to randomly insert additional steps into these pre-defined scripts. For example, the test generator 326 may be capable of randomly inserting a step to visit the link "conditions of use" 441 before completing the information in fields 433-436. In another example, the test generator 326 may be capable of inserting a step to visit the link "learn more" 442 before completing the information in fields 437 and 438.

The test generator 326, as illustrated in FIG. 3, using the test code engine 103 and/or the test code module 213, may be capable of generating a test code 322 by randomly inserting additional steps into a pre-defined script. For example, the test generator 326 may be capable of randomly inserting a step to open the "Conditions of Use" link 440, the "Privacy Notice" link 441, or the "Learn more" link 442, into the script for registering a user. If, in response to opening links 440, 441, and/or 442, an additional window opens on the UI of the executable code under test, then the test code 322 may be capable of including instructions to close the additional window. Similarly, if the URL of the page changes, for example, as the result of a user clicking the "Conditions of Use" link 440, then the test code 322 may be capable of including instructions to revert to the prior URL. By randomly inserting additional steps into the pre-defined script, the test application 321 may be capable of emulating the behavior of a user additionally clicking on links on the user-registry web page 432.

In another example, the test generator 326, using the test code engine 103 and/or the test code module 213, may be capable of generating a test code 322 by disordering the ordered list of commands in the script. For example, referring to FIG. 4, rather than completing fields 433-436, then completing fields 437 and 438, the test code 322 may be capable of including instructions to complete fields 437 and 438, then field 436. In another example, rather than completing fields 433-438, then clicking on the "Create account" link 439, the test code 322 may be capable of including instructions to click the "create account" link 439 before fields 434 and 435. By disordering the ordered list of commands in the script, the test application 321 may be capable of emulating the behavior of a user not completing processes in the correct order.

The test application 321 may be capable of using the test code 322 to test the executable code under test 323. The test code 322 may be capable of specifying tasks of the test that include activation of UI control elements of the executable code under test 323 in a random or ad-hoc manner. The executable code under test 323 may be capable of providing an output, which may be capable of being monitored by the test application 321 to determine whether the executable code under test 323 is exhibiting expected or abnormal behavior.

In response to detecting an abnormality (e.g., abnormal behavior in the executable code under test 323), the test application 321 may be capable of recording test instructions (such as instructions of the test code 322) that relate to actions of the test that caused the abnormality. For example, if the test performed based on the test code 322 produces an abnormality of the executable code under test 323, then the test code 322 can be copied to a persistent file (e.g., 328) for later access to replay the test. The recorded test instructions can be stored in a persistent file 328 in the storage medium 325. In some examples, the recorded test instructions can include a subset (e.g., less than all) or all of the instructions in the test code 322. The recorded test instructions can be used later to replay a test that caused the abnormality of the executable code under test 323.

In some examples, the test code 322 that is created by the test generator 326 may be capable of being stored in a temporary file. If the test performed based on the test code 322 produces an expected behavior of the executable code under test 323, then the temporary file including the test code 322 can be discarded.

The test generator 326, test code 322, executable code under test 323, and test application 321 can be machine-readable instructions executable on one or multiple processors 329. The processor(s) 329 can be coupled to the storage medium 325. Further, the test system 320 can include one computer or multiple computers. In some cases, the test code 322 may be capable of being generated in a first computer, and sent to a second computer to test an executable code under test.

Figure 5:
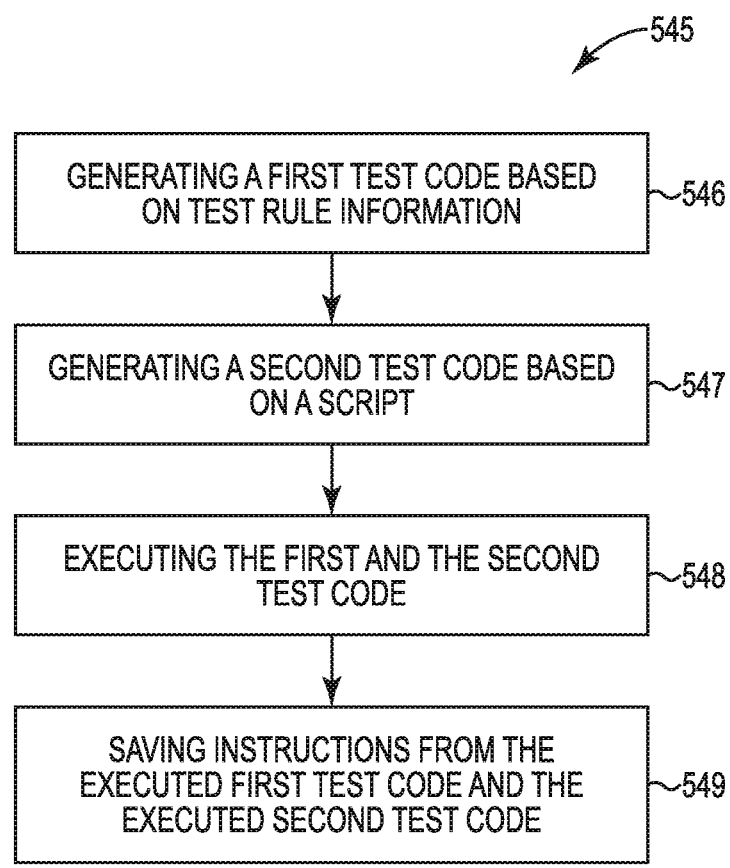
FIG. 5 illustrates an example flow chart of a method for executable code abnormality detection consistent with the present disclosure.
Figure 6:
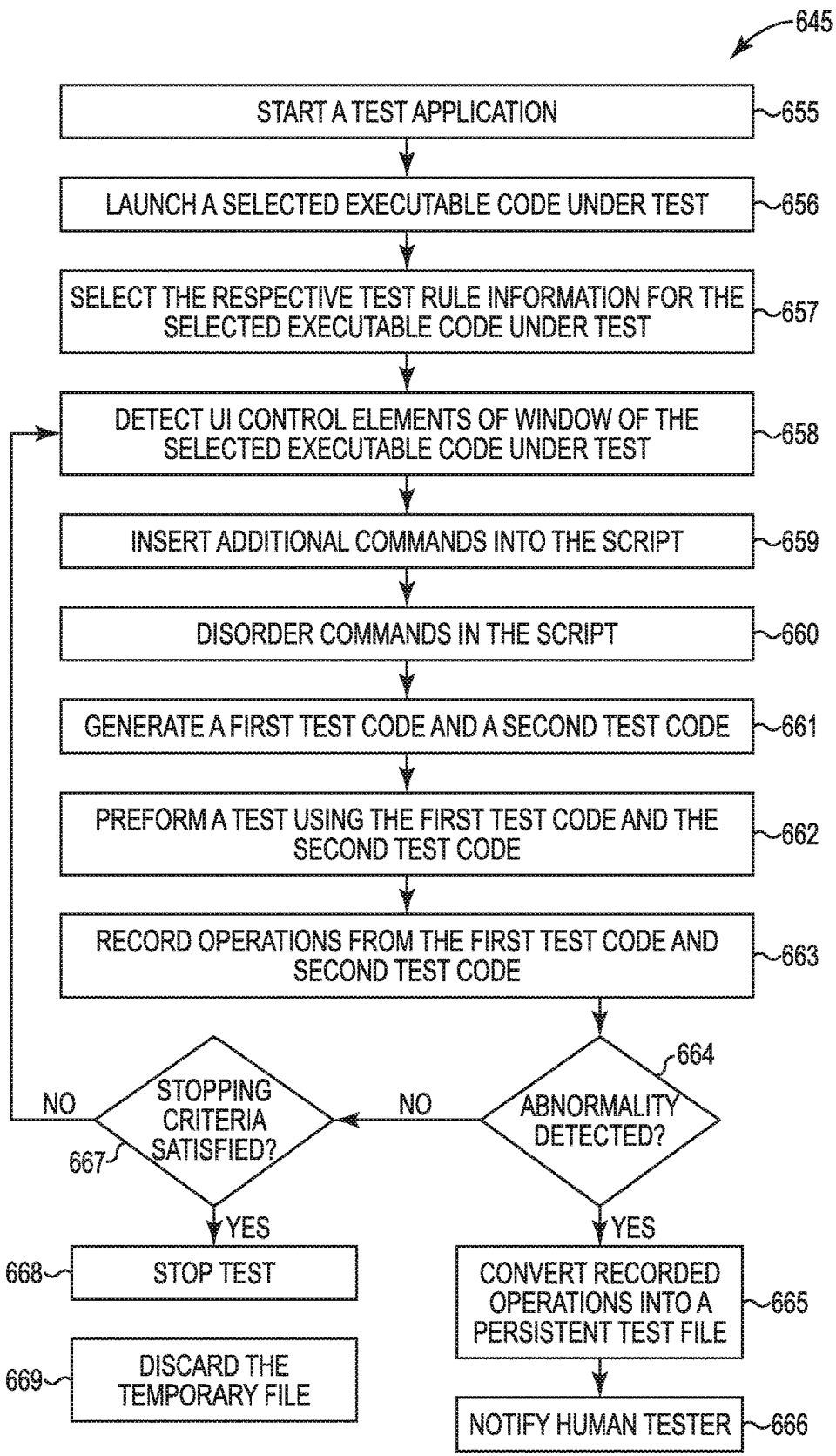
FIG. 6 illustrates an example flow chart of a method for executable code abnormality detection consistent with the present disclosure.

FIG. 5 illustrates an example flow chart of a method 545 for executable code abnormality detection consistent with the present disclosure, and as discussed further in relation to FIG. 6. At 546, the method 545 can include generating a first test code (which can be the test code 322) based on the test rule information 327, using the test code engine 103 and/or the test code module 213. The test rule information 327 includes at least one rule (in non-program format) relating to the testing of the executable code under test 323. The generation of the test code can also be based on detected UI control elements (324 in FIG. 1) as identified by the test application 321. At 547, the method 545 can include generating a second test code based on a script for the executable code to be tested, using the test code engine 103 and/or the test code module 213. The script can be a pre-defined script, having an ordered list of commands to be executed by the executable code under test. Generating the second test code can include randomly inserting additional commands to the script, as described in relation to FIG. 4. Similarly, generating the second test code can include disordering the ordered list of commands in the script, also as described in relation to FIG. 4.

At 548, the method 545 includes executing the first and the second test codes to test the executable code under test 323, using the test code engine 104 and/or the test code module 214. Executing the first test code causes the performance of actions that include automatic operation of user-activatable control elements of the executable code under test 323. Executing the second test code causes additional steps to be inserted into the pre-defined script, and/or the steps in the pre-defined script to be disordered. The first and the second test codes can be executed by the test application 321 in the alternative, or together. That is, either one of the first or second test codes can be executed by the test application 321, or both the first and the second test codes can be executed by the test application 321. In some examples, a translation string-map can also be used to detect abnormalities in the executable code to be tested, as discussed further in relation to FIG. 2.

The method 545 can further include receiving output from the executable code under test 323 during the test (not shown in FIG. 5). The output can indicate that the executable code under test 323 is either behaving as expected or is exhibiting an abnormality. In response to detecting an abnormality of the executable code under test 323 during the test, the method 545 includes saving (at 549) instructions from the executed first test code and the executed second test code to allow replay of the test and to identify a cause of the abnormality, using the reporting engine 105 and/or the reporting module 215.

FIG. 6 illustrates an example flow chart of a method 645 for executable code abnormality detection consistent with the present disclosure. At 655, the method 645 includes starting the test application 321 (FIG. 1). The test application 321 may be capable of presenting a user with a list of different executable code for testing. From the list, the user capable of select an executable code to test.

Once the executable code under test is selected, at 656 the test application 321 may be capable of launching the selected executable code under test. At 657, the method 645 can include selecting the respective test rule information (for the executable code under test). There can be different test rule information for different executable codes under test.

At 658, the test application 321 may be capable of detecting the UI control elements of a window (or windows) of the selected executable code under test. The detection process can be a continual process that is performed during the test of the selected executable code under test. As new windows are opened during the test, the test application 321 may be capable of detecting the UI control elements of the new windows.

At 661, the test generator 326 may be capable of generating a first test code based on the selected test rule information and the detected UI control elements and a second test code based on a script for the executable code to be tested. As illustrated in FIG. 6, the second test code may be capable of being generated by inserting additional commands into the script at 659, and disordering commands in the script at 660. At 662, the first test code and/or the second test code may be capable of being used by the test application 321 to perform a test of the selected executable code under test. The various random operations of the test may be capable of being stored into a temporary file at 663. For example, the instructions of the first test code and/or the second test code may be capable of being recorded into the temporary file.

At 662, the test application 321 may be capable of performing a test using the first test code and the second test code (e.g., executing the first and the second test codes to test the executable code under test 323), as discussed in relation to FIGS. 1-5.

The method 645 can further include receiving output from the executable code under test 323 during the test (not shown in FIG. 6). The test application 321 can receive output from the executable code under test 323 during the test. The output may be capable of indicating that the executable code under test 323 is either behaving as expected or is exhibiting an abnormality.

In response to detecting an abnormality of the executable code under test 323 during the test, at 663, the method 645 includes recording instructions from the executed first test code and the executed second test code to allow replay of the test and to identify a cause of the abnormality. At 664, it can be determined if an abnormality is detected, and in response to detecting an abnormality of the executable code under test during the test, the test application 321 may be capable of converting the recorded operations in the temporary file into a formal persistent test file at 665. At 666, the test application 321 may be capable of notifying a user (e.g., quality assurance engineer or other person) of the detected abnormality. The notification can include an identification of the formal persistent test file such as a pathname or uniform resource locator (URL) of the formal persistent test file. The user may be capable of then using the formal persistent test file to replay the test to allow identification of a cause of the detected abnormality.

At 664, it can be determined if an abnormality is detected, and in response to no abnormality being detected, the method 645 can include determining if a stopping criterion has been satisfied at 667. A stopping criterion can specify that the test is to perform a specified number (e.g., 500, 1000, 5000, etc.) of steps. Alternatively or additionally, the stopping criterion can specify that the test is to be performed for a specified amount of time. If the stopping criterion is satisfied (e.g., the specified number of steps has been performed or the specified amount of time has passed), the test application 321 stops the test at 668, and discards the temporary file at 669.

However, if the stopping criterion has not been satisfied, as determined at 667, the method 645 continues; for instance, if a new window of the selected executable code under test is opened, the UI control elements of the new window are identified at 658, and a further test code may be capable of being generated at 661 for use in further phases of the test.

Figure 7:
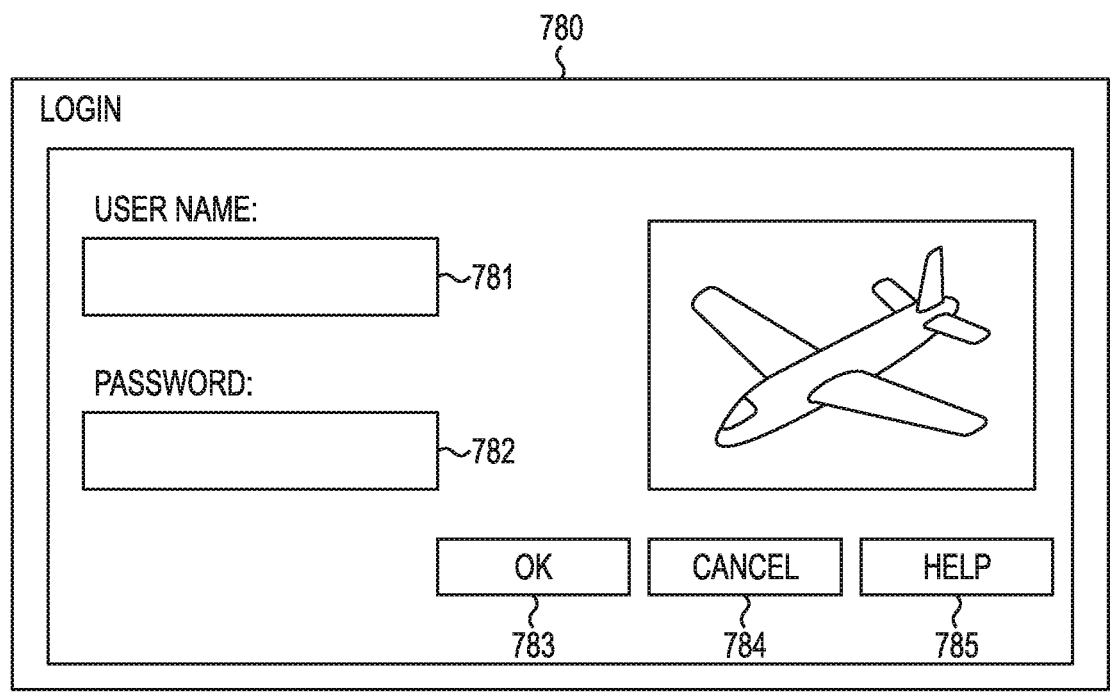
FIG. 7 illustrates a diagram of an example UI screen for executable code abnormality detection consistent with the present disclosure.

FIG. 7 illustrates a diagram of an example UI screen 780 for executable code abnormality detection consistent with the present disclosure. UI screen 780 has various UI control elements of an executable code under test, including a Username text box 781 (in which a user name can be entered), a Password text box 782 (in which a password can be entered), an OK button 783, a Cancel button 784, and a Help button 785. The UI screen 780 can be a Login UI screen in which a user may be capable of logging into the executable code under test. In other examples, different UI screens may be capable of being used.

As described in relation to FIGS. 1-7, generating a first test code can include detecting all of the control elements in the respective window. The detected control elements may be capable of being sorted according to the specified priorities of the control elements, such as the priorities listed in the rule set forth above. The sorted control elements may be capable of being provided in a control list. The sorting can be in descending order, for example.

Generating the first test code can include iterating through each control element in the control list, in an order of the sorting. As long as there is a further control element in the control list to process, the first test code generation process generates a random number, by using a random number generator. In some examples, the random number can be a number between zero and 100. The first test code generation process determines whether the generated random number is less than or equal to the implementation probability (multiplied by 100) that corresponds to the current control element that is being processed. If so, a respective test instruction is generated for the current control element and added to a temporary script file (which corresponds to the first test code that is being generated). However, if the random number is not less than or equal to the implementation probability (multiplied by 100), a test instruction is not generated. As used herein, a test instruction is programming that instructs the test application, using the test code engine 103 and/or the test code module 213, to perform a test.

The first test code generation process iterates to the next control element in the control list. If the end of the control list is reached, the first test code generation process returns. The output of the first test code generation process is the temporary script file (including various test instructions generated at for respective control elements) that provides the first test code that may be capable of being executed to perform a test of the executable code under test consistent with the present disclosure.

In some implementations, a user may be capable of specifying for which of multiple abnormalities are to be monitored, and may be capable of specifying respective differentactions to take to handle the corresponding abnormal statuses. For example, a first abnormal status can be a crash of the executable code under test. The action specified to handle such a crash can be to stop the test, and to collect useful information in a dump file. Another abnormality can be an error message generated by the executable code under test. To handle this latter abnormality, a recovery operation may be capable of being run, and the error may be capable of being ignored following successful performance of the recovery operation.

In other examples, the abnormality can include a globalization defect such as an untranslated string, a wrong data format, or a truncation issue. As described further herein, an untranslated string may be capable of being detected using a translation string-map. Further, a wrong data format may be capable of being identified based on a pre-defined data-format table. A truncation issue is an abnormality in the UI of the executable code under test that erroneously truncates a portion of a string of text.

Figure 8:
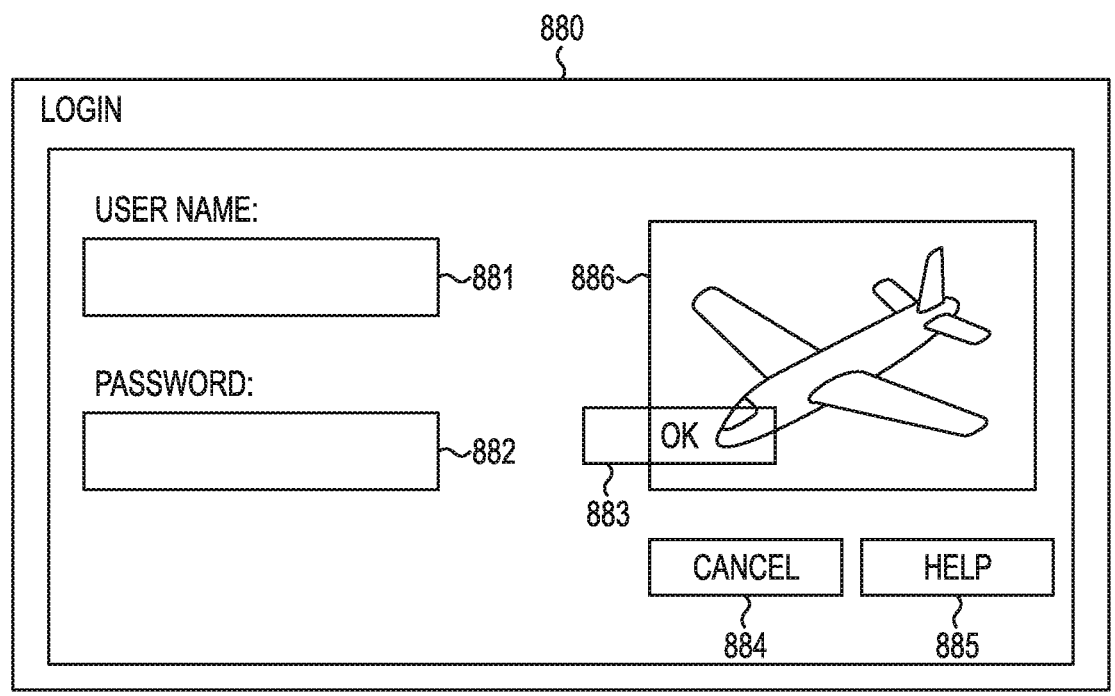
FIG. 8 illustrates a diagram of an example UI screen with an abnormal UI consistent with the present disclosure.

In yet other examples, the abnormality can include an abnormal UI. For example, components of the UI may incorrectly overlap, as illustrated in FIG. 8. FIG. 8 illustrates a diagram of an example UI screen 880 with an abnormal UI consistent with the present disclosure. As illustrated in FIG. 8, the OK button 883 overlaps the airplane illustration 886, indicating an abnormal UI.

A specific example of an abnormal status rule is provided in the table below. An abnormal status rule is a rule that provides information used in identifying at least one abnormality.

| Target | Property | Value | Comment |
| --- | --- | --- | --- |
| Process | PID | Disappeared | Executable Code Under Test Process terminated |
| Popup window | title | "<ProcessName>" | Executable Code Under Test Process exception |
| Popup window | Contain text | "<ProcessName> has stopped working" | |
| Popup window | title | "Unexpected Error" | An abnormal case of Executable Code Under Test |
| Web browser | title | "Web browser cannot display the webpage*" | The URL to open is not available |

The abnormal status rule in the table above specifies four abnormal cases. The four columns of the table containing the abnormal status rule includes a Target column (which identifies the element of the executable code under test 323). In addition, the second column identifies a property of the target element, the third column specifies a value of the property, and the fourth column includes a comment explaining the respective abnormal status. In the first row, the target is a process (which is a process of the executable code under test 323). When a test instruction in the test code 322 is executed, the test application 321 may be capable of checking the abnormal status rule to determine whether an abnormality is present. For example, the test application 321 may check whether the PID of the process of the executable code under test 323 has disappeared (e.g., has the value of "Disappeared"), which is an indication that the process of the executable code under test has terminated.

As another example, the test application 321 may be capable of determining whether a title of a popup window (which has popped up due to execution of the executable code under test 323) is the text "<Process Name>" and the content of the popup window contains the text "<Process Name> has stopped working" (which correspond to the second row of the table containing the abnormal status rule). The foregoing match indicates that an abnormality has occurred.

As another example, the test application 321 may be capable of determining whether a title of a popup window (which has popped up due to execution of the executable code under test 323) is the text "Unexpected Error" (which corresponds to the third row of the table containing the abnormal status rule). The foregoing match indicates that an abnormality has occurred.

The fourth abnormal case (corresponding to the last row of the table containing the abnormal status rule) relates to a web browser not being able to display a webpage, such as due to a uniform resource locator (URL) not being available.

In the present disclosure, reference is made to the accompanying drawings that form a part hereof, and in which is shown by way of illustration how a number of examples of the disclosure may be capable of being practiced. These examples are described in sufficient detail to enable those of ordinary skill in the art to practice the examples of this disclosure, and it is to be understood that other examples may be capable of being used and that process, electrical, and/or structural changes may be capable of being made without departing from the scope of the present disclosure.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., firmware, etc., stored in memory and executable by a processor.

The above specification, examples and data provide a description of the method and applications, and use of the system and method of the present disclosure. Since many examples may be capable of being made without departing from the spirit and scope of the system and method of the present disclosure, this specification merely sets forth some of the many possible embodiment configurations and implementations.

What is claimed is:

1. A system for executable code abnormality detection, comprising:
a test code engine that:
detects user-activatable control elements of an executable code in an executable file to be tested;
generates a first test code based on the detected user-activatable control elements by employing at least one test rule, wherein the at least one test rule specifies a specific type of action associated with each of the detected user-activatable control elements and the at least one rule includes a priority assigned to each of the detected user-activatable control elements, the priorities being indicative of frequencies of operations of the detected user-activatable control elements;
generates a second test code based on a script for the executable code to be tested, the first and the second test codes containing instructions executable by a test application to test the executable code; and
executes the first test code and the second test code using the test application; and
a reporting engine that saves, in response to the test code engine detecting an abnormality, instructions from the executed first test code and the executed second test code into a persistent file to allow replay of the abnormality.

2. The system of claim 1, including the test code engine that generates the second test code by:
randomly inserting additional commands into the script, or
disordering commands in the script.

3. The system of claim 1, wherein the abnormality includes at least one of a globalization defect and an abnormal user interface.

4. The system of claim 1, including the test code engine that detects an untranslated string in the executable code using a translation string map.

5. The system of claim 1, wherein the at least one rule additionally specifies an implementation probability for each of the detected user activatable control elements.

6. The system of claim 1, wherein the frequencies of operations of the user-activatable control elements are expressed as respective implementation probabilities of the user-activatable control elements and the test code engine further:
for each user-activatable control element in a list of the detected user-activatable control elements,
generates a respective random number,
generates a respective test instruction if the random number is less than or equal to a respective implementation probability of the user-activatable control element, and
does not generate the respective test instruction if the respective random number is greater than the respective implementation probability.

7. A non-transitory machine-readable medium storing instructions executable by a processing resource to cause a computer to:
detect user-activatable control elements of an executable code in an executable file to be tested;
generate a first test code using at least one test rule, the first test code based on the detected user-activatable control elements, wherein the at least one test rule specifies a specific type of action associated with each of the detected user-activatable control elements and the at least one rule includes a priority assigned to each of the detected user-activatable control elements, the priorities being indicative of frequencies of operations of the detected user activatable control elements wherein the generation of the first test code includes,
generating a respective random number, and
generating a respective test instruction based at least on the random number;
generate a second test code using a test code engine and based on a script for the executable code to be tested;
execute the first and the second test codes using a test application executed by the test code engine to perform a test of the executable code;
determine additional user-activatable control elements of the executable code, and iterate the generation of the first and the second test codes and the execution of the first and second test codes until a stopping criterion is satisfied; and
in response to the test code engine detecting an abnormality in the executable code, save instructions of the first and the second test codes to allow a replay of the first and the second test codes to identify a cause of the detected abnormality.

8. The non-transitory machine-readable medium of claim 7, wherein the detected abnormality includes at least one of an application crash, a globalization defect, and an abnormal user interface.

9. The non-transitory machine-readable medium of claim 7, including instructions executable to execute a translation string map.

10. The non-transitory machine-readable medium of claim 9, wherein the detected abnormality includes an untranslated string.

11. The non-transitory machine-readable medium of claim 7, wherein the at least one test rule further includes respective implementation probabilities assigned to the detected user-activatable control elements.

12. The non-transitory machine-readable medium of claim 11, wherein the instructions for generating a respective test instruction based at least on the random number include further instructions for:
generating the respective test instruction if the random number is less than or equal to a respective implementation probability of the user-activatable control element, and
not generating the respective test instruction if the respective random number is greater than the respective implementation probability.

13. The non-transitory machine-readable medium of claim 7, wherein executing the first test code causes performance of actions including automatic operation of elements of the executable code.

14. A method for executable code abnormality detection, comprising:
detecting user-activatable control elements of an executable code in an executable file to be tested;
generating, using at least one test rule, a first test code based on the detected user-activatable control elements and at least one test rule, wherein the at least one test rule specifies a specific type of action associated with each of the detected user-activatable control elements and the at least one rule includes a priority assigned to each of the detected user-activatable control elements, the priorities being indicative of respective relative frequencies of operations of the detected user-activatable control elements wherein the generation of the first test code includes:
generating a respective random number, and
generating a respective test instruction based on the random number;
generating, using a test code engine, a second test code based on a script for the executable code to be tested, wherein the script includes an ordered list of commands to be executed by the executable code to be tested, and wherein generating the second test code includes at least one of:
randomly inserting additional commands to the script; and
disordering the ordered list of commands in the script;

executing, using the test code engine, the first test code and the second test code; and in response to detecting an abnormality in the executable code to be tested, saving instructions from the executed first test code and the executed second test code into a persistent file to allow replay of the abnormality.

15. The method of claim 14, further comprising:

executing, using the test code engine, a translation string-map to identify untranslated strings in the application, wherein the translation string-map maps a string written in a specific language to a string in a different language.

16. The method of claim 14, wherein the specific type of action includes an action that is executed in response to activation of the user activatable control element by the user.

17. The method of claim 14, wherein the at least one rule additionally specifies an implementation probability for each of the detected user activatable control elements.

18. The method of claim 17, wherein to generate the one or more random numbers the test code engine further:

for each user-activatable control element in a list of the detected user-activatable control elements, generates a respective random number of the one or more random numbers, generates a respective test instruction if the random number is less than or equal to a respective implementation probability, and does not generate the respective test instruction if the respective random number is greater than the respective implementation probability.

19. The method of claim 18, wherein the random number is between zero and hundred when the implementation probability is multiplied by 100.

* * * * *